May 2, 1967
R. L. BAILEY
3,317,642
VOLUME STABILIZATION OF MOLDED PLASTIC
CONTAINERS BY HEATING AFTER MOLDING
Filed June 6, 1966
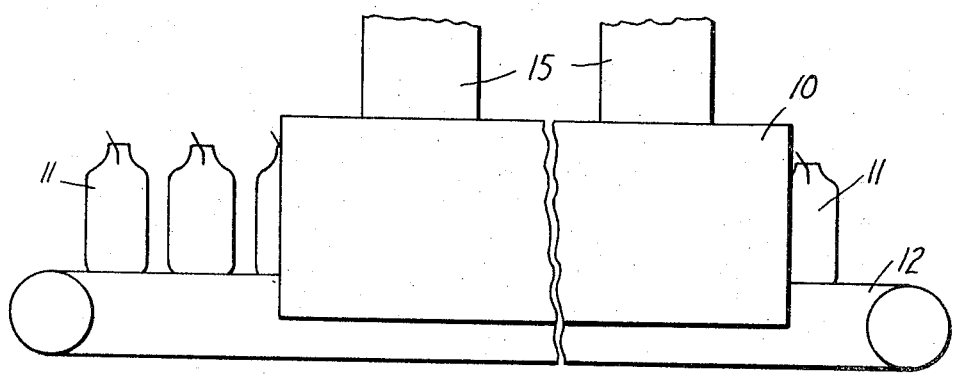
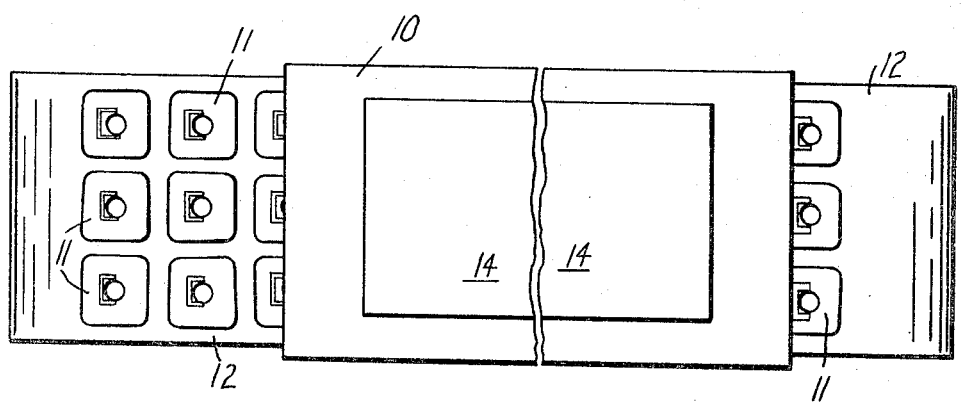
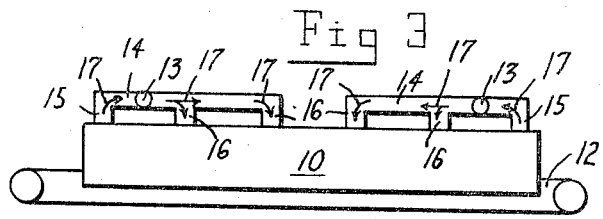
INVENTOR.
ROBERT L. BAILEY

United States Patent Office 3,317,642
Patented May 2, 1967

3,317,642
VOLUME STABILIZATION OF MOLDED PLASTIC CONTAINERS BY HEATING AFTER MOLDING
Robert L. Bailey, Spokane, Wash., assignor to National Distillers and Chemical Corporation, New York, N.Y.
Filed June 6, 1966, Ser. No. 555,374
4 Claims. (Cl. 264—230)

This invention relates to a method of stabilizing the volume of molded plastic resin containers, particularly bottles and jugs, subjected to later intermittent exposure to elevated temperatures at which the contents will shrink in volume if used in the condition at which they emerge from a conventional molding process. The method described herein is designed to pre-shrink each container to its desired working volume and to relieve the container walls of stresses resulting from the usual molding techniques.

The method described below, although having wider application, was developed particularly to adapt plastic jugs for use as reusable milk containers. A method of producing such a jug is disclosed in my co-pending application Ser. No. 310,221, filed Sept. 20, 1963, for Method of Manufacturing Plastic Bottles. Milk bottles or jugs, prior to filling, are subjected to washing operations involving water temperatures ranging to approximately 150° F. It was found in earlier tests that bottles manufactured by blow molding processes and cooled in the mold in the conventional manner would later shrink, when subjected to the washing operations, thereby varying the volumetric measurement of the milk container. This was an unanticipated difficulty perculiar to plastic bottles, yet these same bottles had to meet the requirements relating to volume tolerance which had been established for rigid glass bottles, subject to no shrinkage. To meet this problem the present method was developed, wherein each bottle is molded slightly oversize and pre-shrunk to a stable working volume by heating the bottle to an elevated temperature and holding it at the elevated temperature for a duration of time sufficient to relieve internal stresses in the resin material and to reduce the volume of the container to the point where it will remain stable during subsequent washing operations.

A first object of this invention is to provide a relatively simple method of stabilizing the volume of molded plastic resin containers prior to use of the containers, the method being compatible with conventional molding operations.

Another object of this invention is to provide stabilization of the volume of plastic resin containers subsequent to the molding of the containers so that the semi-rigid plastic container can meet volume specifications established for rigid containers made of other materials, particularly glass.

These and other objects will be evident from the following disclosure, which described in detail the process by which plastic milk jugs of gallon size have been successfully stabilized as to volume, and which generally discloses one apparatus by which such stabilization has been effected. It is obvious that modifications in the details of the process and apparatus are likely to be developed when the method is applied to other types of plastic resin containers, and for this reason, the details in the following description are intended to serve only by way of example.

In the drawings:

FIGURE 1 is an enlarged fragmentary schematic side elevation view of a conveyor and oven for continuously stabilizing plastic resin jugs;

FIGURE 2 is a top view of the apparatus shown in FIGURE 1; and

FIGURE 3 is a side elevation view showing, in schematic form, the complete oven structure at a reduced scale from that used in FIGURE 1.

Basically, the method utilized to stabilize the volume of a plastic container involves reheating of the container following its production by conventional blow molding techniques. The container must be heated to a temperature higher than the washing solution temperatures to which it will later be subjected and held at such elevated temperature for a duration of time such that the interior volume of the container will stabilize to a minimum. It has been found that this operation not only pre-shrinks the container to a stable volumetric configuration, but also relieves the plastic material of internal stresses which accumulates during the stretching of the material by blow-molding and the subjection of the material to the confining mold surfaces. Stabilizing plastic bottles and jugs can be utilized by dairies and other users without detrimental variation in the size or shape of the container.

The stabilization of a plastic container is necessary in order to adapt bottles or jugs made of polyethylene and similar plastic resins for use by dairies as reusable milk containers. Various government agencies having jurisdiction over the marketing of milk and similar products have established standards relating to container volume which must be met in order to provide a transition to plastic containers. This imposes difficulties since the semi-rigid and somewhat variable nature of a plastic resin does not readily adapt such containers to meet standards set down for rigid glass containers or containers made of other materials. However, by stabilizing the volume of the container in the manner described, such standards have been effectively met.

Taking, by way of example, a one gallon plastic milk container blow molded from polyethylene resin, it is necessary that such a jug meet the volumetric requirements for a glass gallon milk container. The permitted volumetric tolerance is only two and a half drams, equal to .3125 fluid ounces.

The polyethylene jug is preferably blow molded. The mold temperatures, against which the plastic resin is formed as a jug, typically range from 360° F. to room temperature during the molding process. The volume of the finished jug can be varied considerably by changing the temperatures of the mold and by increasing or decreasing the dwell time during which the resin is held in the mold. However, by careful regulation of resin formulas and the time and temperature relationships of the molding process, jugs can be molded with reasonably accurate consistency so that the molded jugs will have a substantially constant volume.

The following detailed process description, developed experimentally to meet actual production and industry requirements, is tailored to stabilization of one gallon milk jugs blow molded of 100% polyethylene resin. The jugs have a finished weight of 163 grams and a wall thickness of .050 inch. Obviously, variations in the temperatures and times involved in the process required to adapt it to other bottle weights and thicknesses.

In the case of the above polyethylene jugs, I have found it best to mold the jugs so that, when they emerge from the molding machine, they have an excess interior volume of roughly 100 cubic centimeters. These emerging jugs are cooled substantially to room temperature in the molds and then stabilized by passing the jugs through a heated oven in the manner shown in the drawings. The stabilization process can proceed immediately after forming of the bottles or at a later dater, depending upon production requirements.

The oven is simply an elongated insulated shell 10 through which bottles or jugs 11 move on a continuous conveyor 12. The oven shell 10 is provided with two burners 13, gas or oil fired, which heat air within a longitudinal duct 14 leading to an upright intake duct 15 at the respective ends of the shell 10. Located within the intake ducts 15 are fans to circulate the air in the manner shown by arrows 17 in FIGURE 3. Exhaust ducts 16 are provided at longitudinally spaced positions leading toward the center of the oven shell 10, so that a substantially constant interior temperature is achieved by constantly circulating air within the shell 10.

I have found that the bottles 11 of polyethylene resin can be safely subjected to a temperature of 200° F. to 205° F., approximately the maximum temperature to which the bottles can be heated without deformation. The bottles 11 are held at this elevated temperature for a duration of approximately thirty minutes as they pass through the shell 10. During this time, each bottle 11 will shrink in volume and will emerge from the oven shell 10 with an interior volume of one gallon. The bottles or jugs 11 cool rapidly again to room temperature and are ready for use by dairies or other users.

Reusable milk bottles are typically subjected to washing procedures in a dairy prior to filling. The washing processes normally involve solutions heated to temperatures ranging from 45° to 150° F. Without prior stabilization of the jug volumes, the volume of each jug will vary materially during subsequent washing operations. However, jugs treated as described above emerge from such a washing process with little or no volume change, and can effectively meet the volumetric requirements of the milk industry relating to quantity control and filling procedures. The semi-rigid containers can be used on filling machines designed for rigid containers made of glass and can meet standards of the United States Bureau of Weights and Measures, as well as standards established by various state agencies.

This method can be adapted to bottles molded of materials other than polyethylene. In any case, the elevated temperature to which the containers are heated should be the maximum temperature which they can sustain without deformation. In case of a polypropylene container, the elevated temperature should be in the range of 220° to 230° F. and the amount of shrinkage will be less than is attained in the case of polyethylene containers.

By careful control of the molding procedure by which the bottles are originally formed, and subsequent stabilization by reheating of the bottles, both dairy and governmental requirements relating to milk container volume can be and have been effectively met. The governmental requirement is that each jug of milk must hold a full gallon. The dairies require that excess milk not be provided within a container. Regulations pertaining to the depth of the air space above the milk in a jug are also capable of being met by jugs treated as described above.

The apparatus described and illustrated for use in carrying out the method disclosed above is solely by way of example. Obviously, the containers can be handled in batches rather than on a continuous moving belt. Other types of heating equipment can be used, such as infra-red heating elements. For these reasons, only the following claims are intended to define the invention itself.

Having thus described my invention, I claim:
1. A method of stabilizing molded plastic resin containers subject to later intermittent exposure to elevated temperatures above the normal temperatures of the environment to which the container is to be utilized, comprising:
   molding the container initially so as to provide it with an interior volume in excess of the desired container storage volume;
   cooling the container to room temperature;
   heating the container to a selected temperature above said elevated temperature and below the melting point of the resin from which the container is molded;
   maintaining the container at said temperature for a duration of time sufficient to stabilize the interior volume of the container at the desired container storage volume and to insure maximum volume shrinkage at said temperature;
   and cooling the stabilized container to room temperature.

2. A method as defined in claim 1 wherein the temperature to which the container is heated during stabilization is the maximum temperature to which the container resin can be subjected without loss of its general shape.

3. A method as defined in claim 1 wherein the containers are molded of polyethylene having a melting point of approximately 260° F.;
   the elevated temperature utilized during the heating step being 200° to 205° F., the duration of time during which the containers are subjected to said elevated temperature being approximately thirty minutes.

4. The method as defined in claim 1 wherein the containers are closed gallon jugs having a dry weight of about 163 grams and an average wall thickness of about .050 inch, the jugs being molded of polyethylene resin having a melting point of approximately 260° F. and being subjected to later washing temperatures of approximately 145° F.;
   each jug being subjected to an elevated temperature of 200° F. to 205° F. for a duration of approximately thirty minutes, the initial volume of each jug being approximately 100 cubic centimeters greater than the desired working volume.

References Cited by the Examiner

UNITED STATES PATENTS

| 2,373,093 | 4/1945 | Baker | 264—235 |
| 2,980,963 | 4/1961 | Makowski | 264—235 |

FOREIGN PATENTS

| 124,188 | 5/1947 | Australia. |

OTHER REFERENCES

Dunlop, R. I., Pokigo, F. J., Glick, S. E.: "Annealing Injection-Molded Styrene," Modern Plastics, August 1950 (pp. 83, 86, 88 and 89).

ALEXANDER H. BRODMERKEL, Primary Examiner

F. S. WHISENHUNT, A. H. KOECKERT,
Assistant Examiners.